United States Patent
Papanikolaou et al.

(10) Patent No.: US 10,308,224 B2
(45) Date of Patent: Jun. 4, 2019

(54) DEVICE TO BREAK ICE ACCUMULATION AROUND CONVERTIBLE WINDOWS BY USING VIBRATIONS

(71) Applicant: Ford Global Technologies, LLC, Dearborn, MI (US)

(72) Inventors: Kosta Papanikolaou, Huntington Woods, MI (US); Erin Rose Briggs, Detroit, MI (US); Muhammad Omer Khan, Ypsilanti, MI (US); Livianu Dorin Puscas, Rochester Hills, MI (US); Christopher Matthew Radjewski, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/611,951

(22) Filed: Jun. 2, 2017

(65) Prior Publication Data

US 2018/0345910 A1 Dec. 6, 2018

(51) Int. Cl.
| E05F 15/20 | (2006.01) |
| B60S 1/02 | (2006.01) |
| E05F 15/689 | (2015.01) |
| B08B 7/02 | (2006.01) |
| B60S 1/56 | (2006.01) |
| E05F 15/695 | (2015.01) |
| B60J 1/17 | (2006.01) |
| B60J 5/04 | (2006.01) |

(52) U.S. Cl.
CPC ............... *B60S 1/026* (2013.01); *B08B 7/02* (2013.01); *B60S 1/56* (2013.01); *E05F 15/689* (2015.01); *E05F 15/695* (2015.01); *B60J 1/17* (2013.01); *B60J 5/0416* (2013.01); *E05Y 2400/32* (2013.01); *E05Y 2800/414* (2013.01); *E05Y 2900/508* (2013.01)

(58) Field of Classification Search
CPC .......... B60S 1/026; E05F 15/689; B08B 7/02; B60J 5/0416; B60J 1/17
See application file for complete search history.

(56) References Cited

U.S. PATENT DOCUMENTS

| 3,171,683 | A | * | 3/1965 | Ludwig ................ B60S 1/02 |
| | | | | 15/250.001 |
| 4,631,391 | A | * | 12/1986 | Tiepke ............... B60R 1/0602 |
| | | | | 219/219 |
| 4,833,373 | A | * | 5/1989 | Doi .................. B60R 1/0602 |
| | | | | 15/250.001 |

(Continued)

FOREIGN PATENT DOCUMENTS

| DE | 10005341 A1 | 8/2001 |
| JP | 2006200334 A | 8/2006 |
| WO | 0068047 A1 | 11/2000 |

*Primary Examiner* — Jerry E Redman
(74) *Attorney, Agent, or Firm* — Vichit Chea; Price Heneveld LLP

(57) ABSTRACT

A convertible vehicle includes a door having a window and a powered actuator that moves the window from a closed position to a partially open (set) position to permit the vehicle door to open. A controller actuates the powered actuator to shift the window to a set position upon receiving a door open request signal. The controller actuates a powered vibrating mechanism to break ice on the window if actuating the powered actuator does not cause the window to move to the set position.

10 Claims, 3 Drawing Sheets

(56) References Cited

U.S. PATENT DOCUMENTS

| | | | | |
|---|---|---|---|---|
| 5,013,888 | A | * | 5/1991 | Okada .................. B60R 1/0602 219/219 |
| 5,172,024 | A | * | 12/1992 | Broussoux ............ B06B 1/0688 310/321 |
| 5,475,530 | A | * | 12/1995 | Fujie ..................... B60R 1/0602 219/219 |
| 7,084,553 | B2 | * | 8/2006 | Ludwiczak ............... B08B 7/02 310/321 |
| 7,770,453 | B2 | * | 8/2010 | Ludwiczak ............... B06B 3/00 73/579 |
| 8,087,297 | B2 | * | 1/2012 | Ludwiczak ............... B06B 3/00 310/321 |
| 8,517,313 | B2 | * | 8/2013 | Gornik .................. B64D 15/20 244/134 F |
| 9,155,430 | B2 | | 10/2015 | Hertzberg |
| 9,316,436 | B2 | * | 4/2016 | Trevett ..................... B60S 1/02 |
| 9,512,662 | B1 | | 12/2016 | Dudar et al. |
| 9,737,916 | B2 | * | 8/2017 | Schneider ............. B64D 15/16 |
| 2002/0101210 | A1 | * | 8/2002 | Boisvert ............... B60J 7/0573 318/469 |
| 2004/0035912 | A1 | * | 2/2004 | Li ....................... B23K 20/106 228/110.1 |
| 2010/0031972 | A1 | * | 2/2010 | Royer, Jr. ............. B64D 15/00 134/1 |
| 2011/0174332 | A1 | * | 7/2011 | Gohl ........................ B08B 7/02 134/1 |
| 2014/0041302 | A1 | * | 2/2014 | Heirtzler ............... B60J 10/046 49/31 |
| 2018/0022318 | A1 | * | 1/2018 | Parsons .................. B60S 1/026 |
| 2018/0105140 | A1 | * | 4/2018 | Dudar .................... B60S 1/026 |

\* cited by examiner

DEVICE TO BREAK ICE ACCUMULATION AROUND CONVERTIBLE WINDOWS BY USING VIBRATIONS

FIELD OF THE INVENTION

The present invention generally relates to convertible vehicles with doors having powered windows, and more particularly relates to a vibration device that breaks ice on a window of a convertible to permit the window to open so that the door can be opened.

BACKGROUND OF THE INVENTION

In conventional motor vehicles having hard tops (i.e. non-convertible vehicles), the doors of the vehicle typically include a rigid frame that extends around the window, and the window engages the frame when the window is in a closed position. Because the frame moves outwardly with the door, the door can be opened with the window in a fully closed position.

In contrast, the windows of motor vehicles including a convertible top typically engage the convertible top when closed, and the window must be lowered to disengage the convertible top to permit the door to be opened. Thus, in convertible vehicles the powered windows may be configured to move from a fully closed position to a partially open or "set" position to permit the vehicle door to be opened.

In convertible vehicles, ice may form around the window when the window is in a closed position. This ice may prevent movement of the window to disengage the window from the convertible top. Thus, ice buildup may make it difficult or impossible to open the vehicle door.

SUMMARY OF THE INVENTION

One aspect of the present disclosure is a door system for convertible vehicles. The system includes a door having a latch that is configured to selectively retain the door in a closed position. The door system further includes a window assembly having a window and a powered window actuator that is configured to move the window from a closed position to an open position to thereby permit the vehicle door to open. The door system further includes a user input that is configured to provide a door open request. A powered vibrating mechanism is configured to vibrate the window to break ice on the window. The door system further includes a controller that is configured to actuate the powered window actuator to shift the window from the closed position to an open position when a door open request is generated by the user input. The controller is further configured to actuate the powered vibrating mechanism to break ice on the window if actuating the powered actuator of the window does not cause the window to move from the closed position to an open position. The open position may comprise a partially opened set position.

Embodiments of the first aspect of the disclosure may include any one or a combination of the following features:
The user input may comprise a switch or sensor on the vehicle, or it may comprise a wireless fob.
The vibrating mechanism may comprise an electric motor and an offset weight mounted to a shaft of the motor.
The controller may be configured to actuate the powered window actuator and the powered vibrating mechanism sequentially or simultaneously.

Another aspect of the present disclosure is a convertible vehicle door including a window assembly. The window assembly includes a window, a powered window actuator, and a powered vibrating mechanism. The convertible vehicle door further includes a controller that is configured to actuate the powered actuator to move the window to a set position upon receiving a door open request. The controller is further configured to actuate the powered vibrating mechanism to break ice on the window if the window does not move to a set position when the powered actuator of the window assembly is actuated.

Embodiments of the second aspect of the disclosure may include any one or a combination of the following features:
The door may include user input which may comprise a switch or sensor on the vehicle, or comprise a wireless fob.
The vibrating mechanism may comprise an electric motor and an offset weight mounted to a shaft of the motor.
The controller may be configured to actuate the powered window actuator and the powered vibrating mechanism sequentially or simultaneously.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
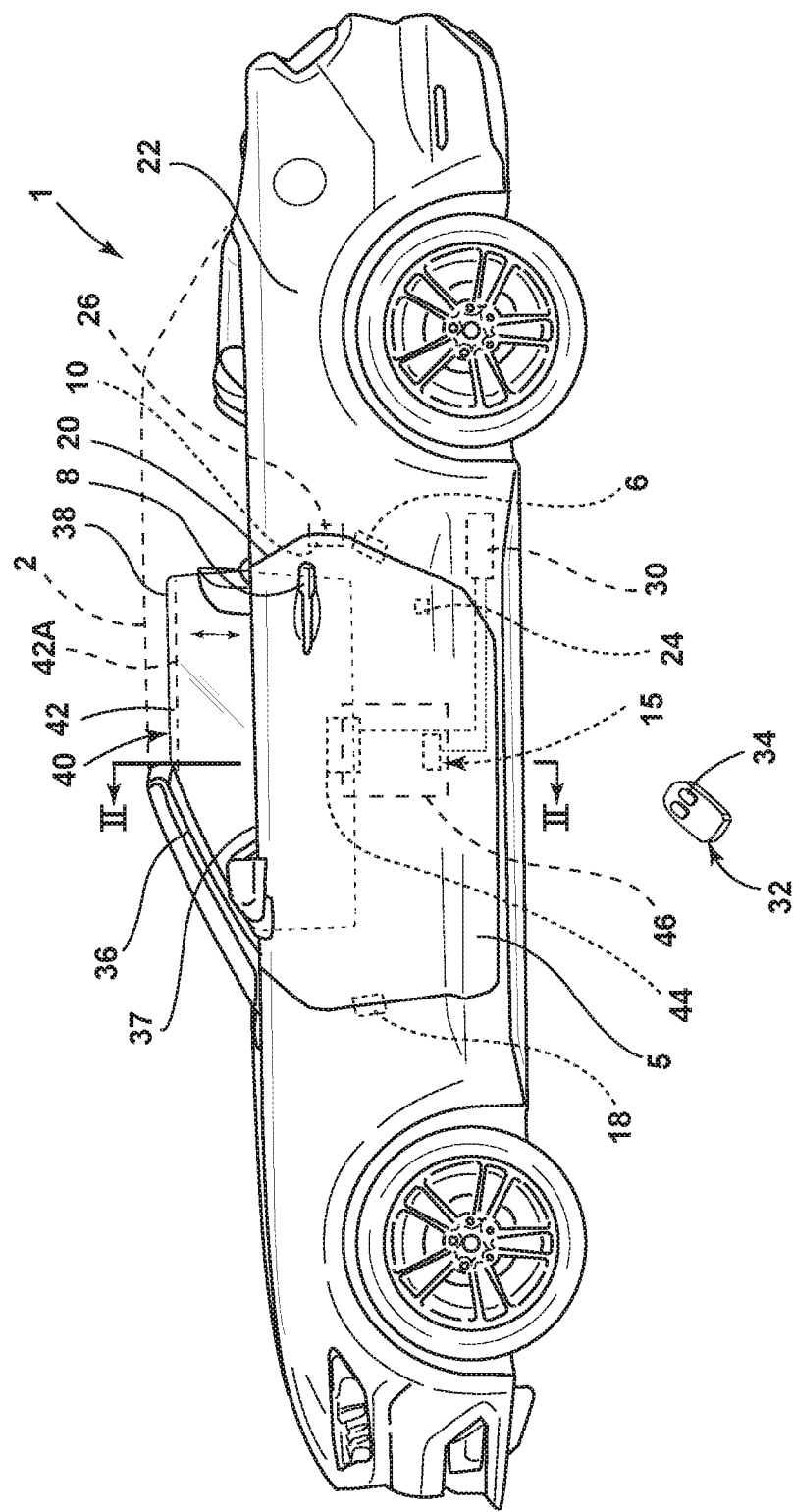
FIG. 1 is a side elevational view of a convertible vehicle including a powered window assembly and vibrating mechanism according to one aspect of the present disclosure.

For purposes of description herein, the terms "upper," "lower," "right," "left," "rear," "front," "vertical," "horizontal," and derivatives thereof shall relate to the vehicle and door system as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

With reference to FIG. 1, a convertible vehicle 1 includes a convertible top 2 that can be raised and lowered in a known manner. Vehicle 1 includes a door 5 that is selectively retained in a closed position by a latch 6. If the convertible top 2 is raised, window 42 of door 5 must be at least partially opened/lowered to disengage upper edge 38 of window 42 from convertible top 2 prior to opening door 5.

As discussed in more detail below, door 5 may include a powered vibrating mechanism 15 that is operably connected to window 42 to break ice on the window 42 to thereby permit lowering of window 42 in the event ice has built up on window 42.

Door 5 may further include a handle 8 that is operably connected to the latch 6 by linkage 10. Linkage 10 may comprise a conventional link or cable that mechanically interconnects the handle 8 and latch 6, such that movement of handle 8 unlatches the latch 6 to permit the door 5 to open. Alternatively, latch 6 may comprise an electrically powered latch having a powered actuator that shifts the latch 6 between latched and unlatched states. If latch 6 comprises a powered latch, handle 8 may be stationary, and the handle 8 may include switches or sensors 14 (FIG. 2) that detect a user's hand to thereby cause actuation of the powered latch 6. Door 5 may optionally include a powered hinge 18 that rotates the door 5 from a closed position to an open position and/or from an open position to a closed position. Door 5 may also optionally include a linear actuator 24 that can be actuated to push the door 5 to a partially open position in which rear edge 20 of door 5 is spaced apart from the vehicle body panel 22 such that a user can grasp edge 20 (rather than handle 8) to open door 5. If vehicle door 5 includes powered hinge 18 and/or powered actuator 24, the door 5 may not include a handle 8. Also, vehicle body panel 22 may optionally include an outwardly-facing pocket 26 directly adjacent rear edge 20 of door 5 to thereby enable a user to grasp rear edge 20 of door 5 to open the door 5. If the body panel 22 includes a pocket 26, the door 5 does not need to include a handle 8, even if door 5 is not equipped with a powered hinge 18 and/or linear actuator 24. The powered latch 6, powered hitch 18, and linear actuator 24 are described in more detail in co-pending U.S. patent application Ser. No. 15/227,672, filed on Aug. 3, 2016, entitled "PRIORITY DRIVEN POWER SIDE DOOR OPEN/CLOSE OPERATIONS," now U.S. Pat. No. 10,227,810, issued on Mar. 12, 2019, and U.S. patent application Ser. No. 15/269,281, filed on Sep. 19, 2016, entitled "ANTI-PINCH LOGIC FOR DOOR OPENING ACTUATOR." The entire contents of each of these applications are incorporated herein by reference.

Vehicle 1 includes a controller 30 that may be operably connected to the sensors or switches 14 of handle 18. When a user actuates the sensors or switches 14 by grasping handle 8, the presence of the user's hand may be interpreted by controller 30 as an unlatch or door open request. Similarly, a remote fob 32 may include inputs 34 (e.g. push buttons) whereby the fob 32 can be utilized to generate a door open request that is received by controller 30. If vehicle door 5 does not include a handle 8, the switches or sensors 14 may be positioned adjacent rear edge 20 of door 5, directly adjacent pocket 26, such that a user actuates the switches or sensors 14 when the user inserts a hand into pocket 26 to pull on rear edge 20 of door 5. If vehicle door 5 includes a movable handle 8 that is mechanically connected to a latch 6 via mechanical linkage 10, switches or sensors 14 may comprise switches that detect outward movement of handle 8 to thereby generate a door open request to the controller 30. It will be understood that a door open request to controller 30 may be generated in a variety of different ways depending on the particular configuration of the vehicle door 5.

Door 5 includes a window assembly 40 including a window 42. Window 42 is shifted upwardly and downwardly upon actuation of a powered actuator 44 of window mechanism 46. Door 5 may include one or more user inputs 48A and 48B (FIG. 2) disposed on an interior side 50 of door 5. The user inputs 48A and 48B may comprise switches or sensors (e.g. proximity sensors) that are operably connected to the controller 30. In use, a user actuates switch 48A to thereby cause controller 30 to actuate powered actuator 44 to shift window 42 up. Actuation of switch 48B causes controller 30 to actuate powered actuator 44 to move window 42 downwardly. Powered actuator 44 may comprise an electric motor or other suitable mechanism. Window mechanism 46 may include a sensor that detects a position of window 42 such that controller 30 is able to determine a position of window 42. For example, window mechanism 46 may include limit switches (not shown) that are actuated (or deactuated) when window 42 is in a fully open position and/or a fully closed position. Also, powered actuator 44 may include a position sensor (not shown) that provides controller 30 with a position signal concerning the position of window 42. Similarly, powered actuator 44 may comprise an electric stepper motor such that controller 30 can determine a position of window 42. The powered actuator 44, window mechanism 46, and user inputs 48A and 48B may be substantially similar to known power window mechanisms. For example, the window mechanism 46 may be substantially similar to the mechanism described in U.S. Pat. No. 9,512,662, the entire contents of which are incorporated herein by reference.

In use, a user approaching vehicle 1 generates a door open request to controller 30 utilizing fob 32 and/or switches or sensors 18 on handle 8. As discussed above, the door open request may be generated in various ways, depending upon the specific configuration of door 5. Upon receiving a door open request, controller 30 actuates powered actuator 44 to shift window 42 downwardly to a fully open position or to a partially open or set position 42A in which upper edge 38 of window 42 is disengaged from convertible top 2. However, if ice has built up on window 42 at convertible top 2, windshield structure 36 and/or edge 37 of door 5, in a manner that prevents movement of window 42, actuation of powered actuator 44 will not result in movement of window 42 to the set position 42A. If this occurs, controller 32 then actuates the vibrating mechanism 15 to thereby vibrate window 42 and break the ice. Controller 30 then again attempts to open window 42 by actuating powered actuator 44 of window mechanism 46. Actuation of powered actuator 44 of window mechanism 46 and vibrating mechanism 15 may occur simultaneously, or in sequence. If powered actuator 44 is actuated first, followed by actuation of vibrating mechanism 15, this cycle may be repeated until the window 42 is lowered to the set position 42A. Controller 30 may be configured to halt the cycle after a selected number of cycles (e.g. 5 or 10). Similarly, if powered actuator 44 and vibrating mechanism 15 are actuated simultaneously, controller 30 may be configured to halt actuation of vibrating mechanism 15 and powered actuator 44 after a preselected period of time (e.g. 10 or 20 seconds).

Controller 30 may also be configured to actuate the vibrating mechanism 15 if other operating conditions are present. For example, controller 30 may be configured to actuate the vibrating mechanism 15 any time window 42 does not move despite actuation of powered actuator 44. This permits breaking of ice to open and/or close window 42 even if a user is not attempting to open door 5. When configured in this way, the vibrating device 15 may be utilized in non-convertible vehicles.

Figure 2:
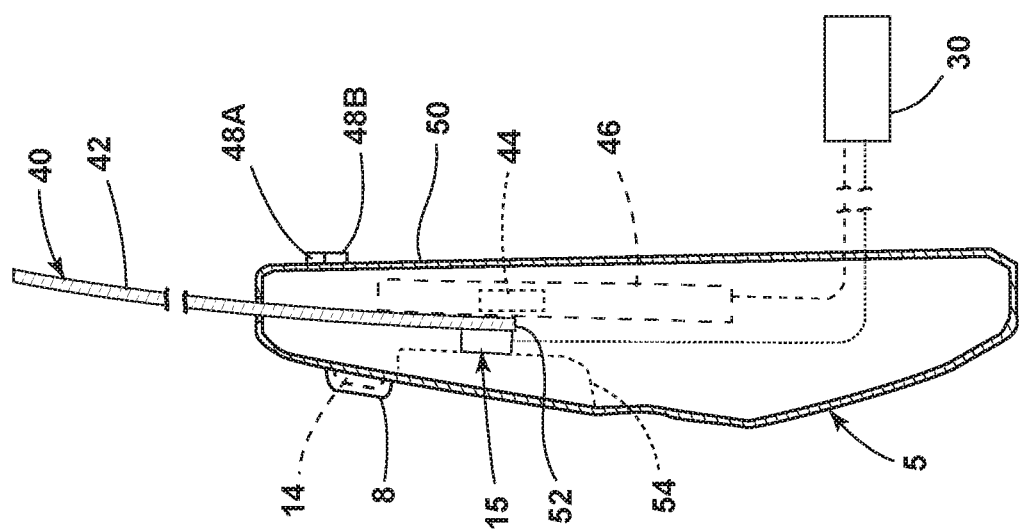
FIG. 2 is a partially fragmentary cross sectional view of the vehicle door of FIG. 1 taken along the line II-II.

As shown in FIG. 2, vibrating mechanism 15 may be secured to a lower portion 52 of window 42, such that the vibrating mechanism 15 moves upwardly and downwardly with window 42. Alternatively, vibrating mechanism 15 may be mounted to internal door structure 54 such that the vibrating mechanism 15 is in sliding contact with window 42.

Figure 4:
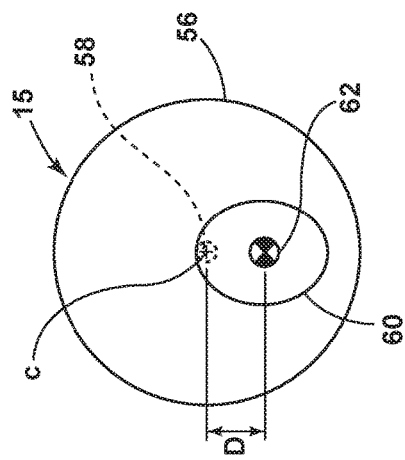
FIG. 4 is a partially schematic top plan view of the vibrating device of FIG. 3.
Figure 5:
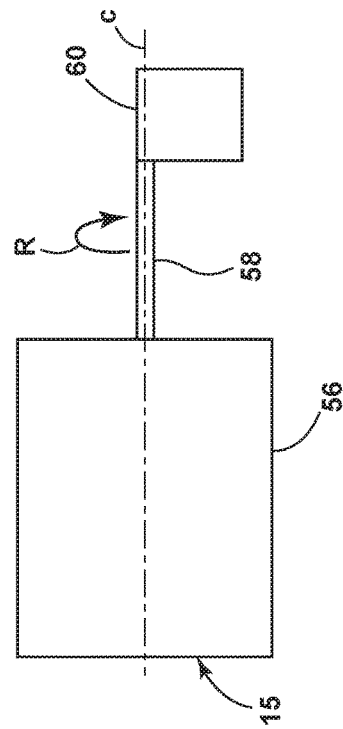
FIG. 5 is a partially schematic side elevational view of the vibrating device of FIG. 3.
Figure 3:
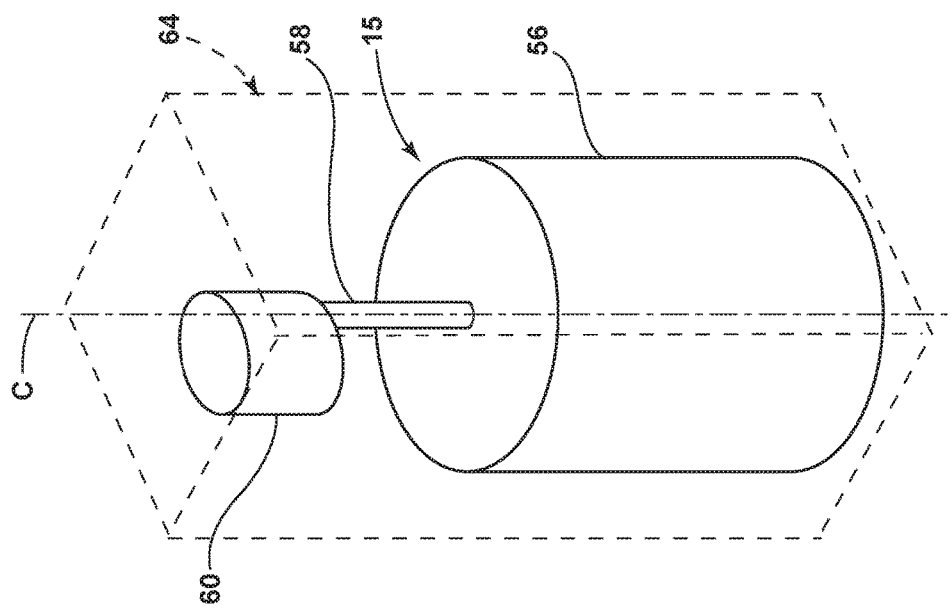
FIG. 3 is a partially schematic isometric view of a vibrating device.

With further reference to FIGS. 3-5, vibrating mechanism 15 may include an electric motor 56 having a rotating output shaft 58 defining a centerline "C". An offset mass/weight 60 is secured to the shaft to thereby cause vibration upon rotation "R" of shaft 58. As shown in FIG. 5, the center of mass 62 of weight 60 may be offset from centerline C of shaft 58 a distance "D." Motor 56 may rotate at about 500 rpm to about 14,000 rpm. During operation, motor 56 may rotate at a constant rpm, or it may rotate at a variable rate. For example, the rpm may sweep through a range of 500-14,000 rpm in a linear or sinusoidal manner, or the rpm may alternate between 500 rpm and 14,000 rpm according to a step type function. Weight 60 may have a mass of about 1 gram to about 10 grams. The distance D of the offset of the center of mass 62 may be about 1 mm to about 10 mm. However, the present disclosure is not limited to these examples. Furthermore, it will be understood that the vibrating mechanism 15 may have various configurations, and the present invention is not limited to the configuration of FIGS. 3-5. For example, mass 60 may be configured to reciprocate to generate vibrations, and electric motor 56 may comprise a linear actuator (e.g. a solenoid).

Referring again to FIG. 3, the vibrating mechanism 15 may include a mounting structure 64 that is configured to secure the vibrating mechanisms 15 to the window 42 or internal door structure 54 (FIG. 2). The structure 64 may comprise a housing, bracket, or other suitable structure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A door system for convertible vehicles, the door system comprising:
    a door;
    a latch;
    a window assembly including a window and a powered actuator that, when actuated, moves the window from a closed position to an open position to permit the door to open;
    a user input;
    a powered vibrating mechanism that, when actuated, vibrates the window to break ice on the window;
    a controller that actuates the powered actuator to shift the window from the closed position to an open position when a door open request is generated by the user input, and:
    wherein the controller actuates the powered vibrating mechanism to break ice on the window when actuating the powered actuator of the window does not cause the window to move from the closed position to an open position.

2. The door system of claim 1, wherein:
the powered vibrating mechanism includes an electrically powered actuator that causes vibration when actuated.

3. The door system of claim 2, wherein:
the electrically powered actuator comprises an electric motor having a rotating shaft.

4. The door system of claim 3, wherein:
the electrically powered actuator includes a weight connected to the shaft, and wherein the weight is offset from the centerline of the shaft.

5. The door system of claim 4, wherein:
the electric motor rotates at about 500 rpm to about 14,000 rpm when actuated.

6. The door system of claim 5, wherein:
the electric motor rotates at a substantially constant rpm.

7. The door system of claim 1, wherein:
the window is movable from a closed position to a partially open set position; and
the controller is configured to actuate the powered actuator of the window assembly to move the window from the closed position to the partially open set position upon receiving a door open request generated by the user input.

8. The door system of claim 7, including:
a window control input feature disposed on an interior side of the door; and
wherein the controller is configured to actuate the powered actuator of the window assembly and move the window to a partially open set position upon actuation of the window control input feature.

9. The door system of claim 1, wherein:
the powered vibrating mechanism is secured to the window and moves with the window.

10. The door system of claim 1, wherein:
the door includes a door structure;
the powered vibrating mechanism is secured to the door structure such that the powered vibrating mechanism does not move with the window, and
wherein the window engages the powered vibrating mechanism when the window is in the closed position.

* * * * *